J. M. RUTLEDGE.
AGRICULTURAL MACHINERY.
APPLICATION FILED APR. 14, 1911.
1,088,038.
Patented Feb. 24, 1914.
2 SHEETS—SHEET 1.
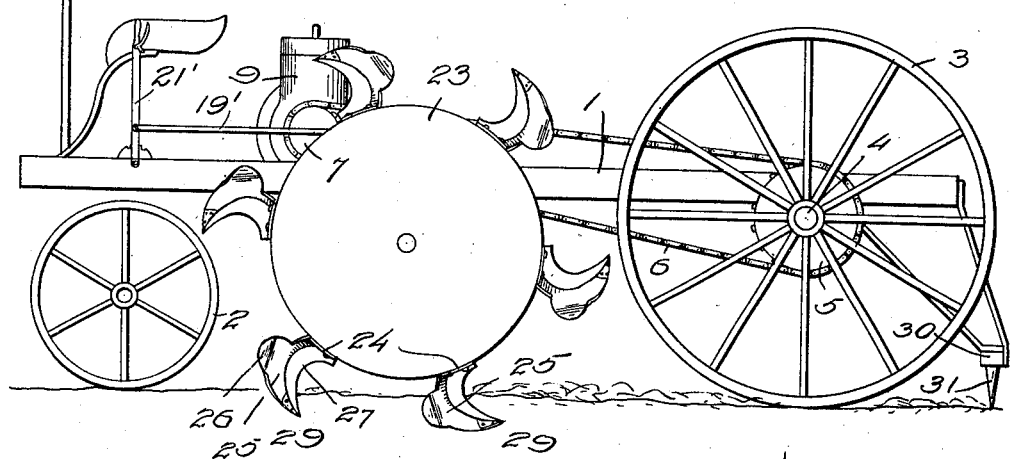
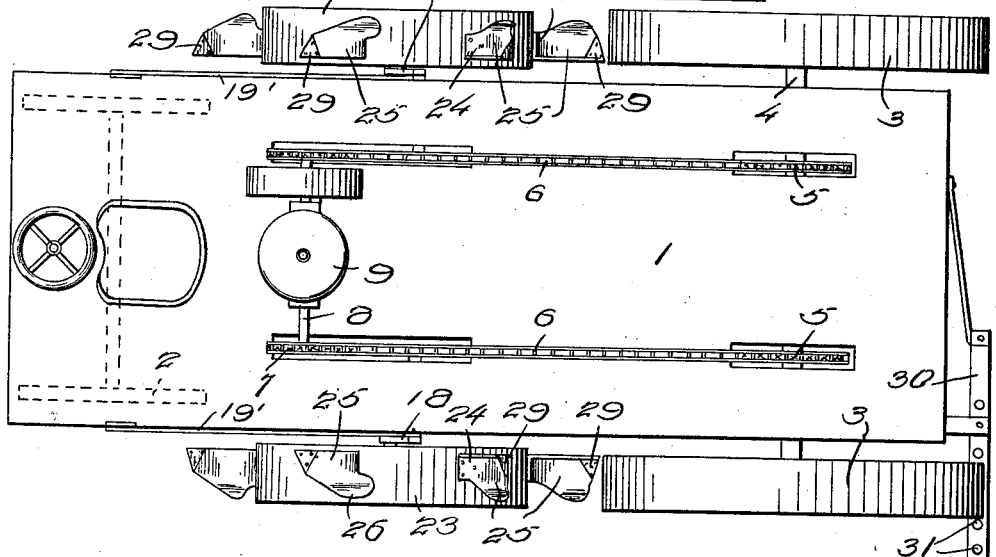

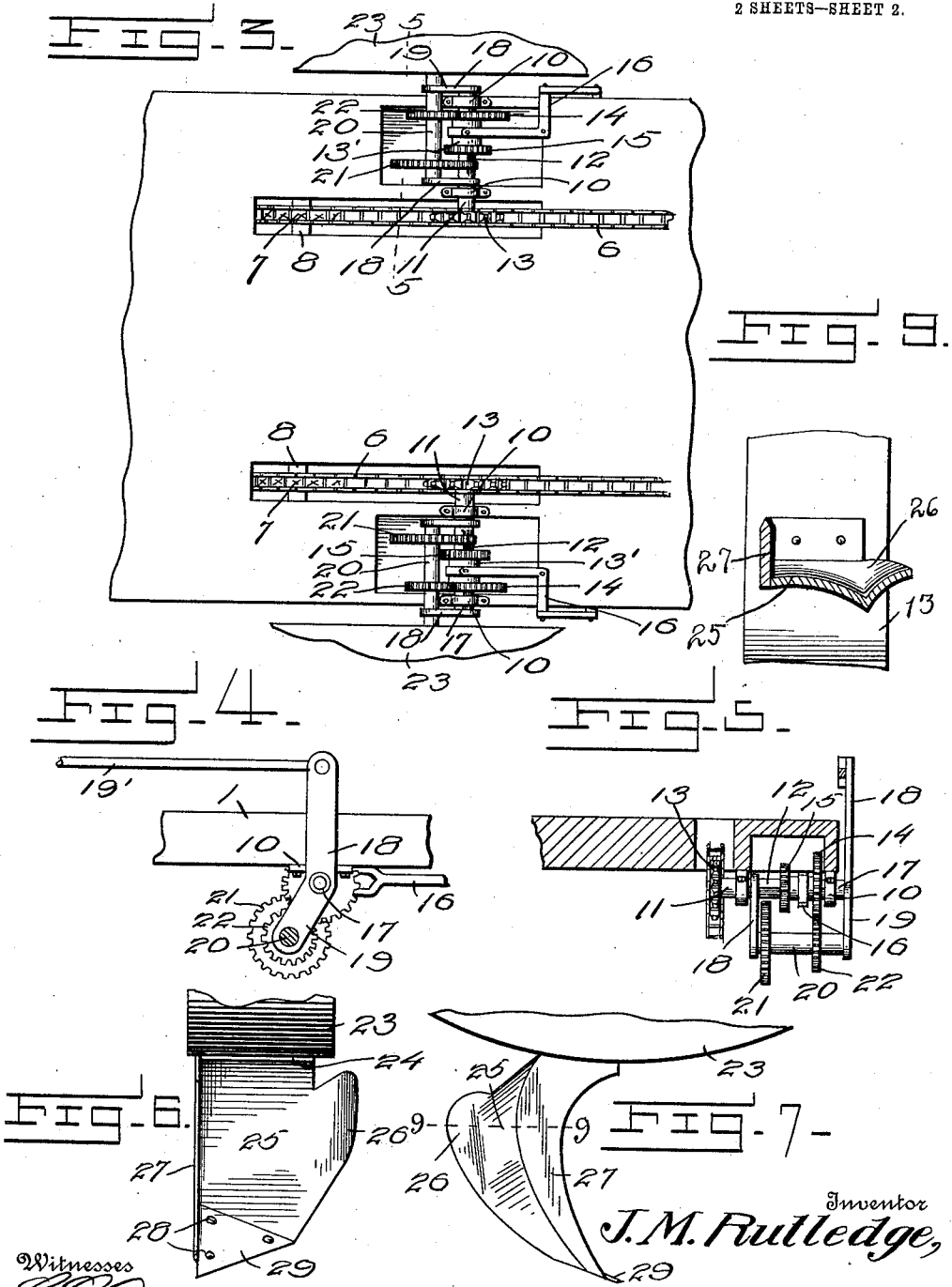

UNITED STATES PATENT OFFICE.

JAMES M. RUTLEDGE, OF RIALTO, FLORIDA.

AGRICULTURAL MACHINERY.

1,088,038. Specification of Letters Patent. Patented Feb. 24, 1914.

Application filed April 14, 1911. Serial No. 621,015.

*To all whom it may concern:*

Be it known that I, JAMES M. RUTLEDGE, a citizen of the United States, residing at Rialto, in the county of Lee and State of Florida, have invented certain new and useful Improvements in Agricultural Machinery, of which the following is a specification.

My invention relates to improvements in agricultural machinery and has for its leading object the provision of a combined machine which will serve to both plow or turn the soil and to clear the roots therefrom.

A further object of my invention is the provision of an improved form of soil turning and root cutting implement which may be readily adjusted to operate at different depths.

Another object of the invention is the provision of improved means for driving said cutter at varying rates of speed and the provision of an improved cutter having removable blade portions which can be readily replaced.

To attain the desired objects my invention comprises an agricultural machine substantially as illustrated and as hereinafter described, although it will be understood that I may make any changes in construction within the scope of the claims without departing from the spirit of the invention.

Figure 1 represents a side elevation of the complete machine. Fig. 2 represents a top plan view thereof. Fig. 3 represents a bottom plan view of the driving and transmission gearing. Fig. 4 represents an enlarged detailed view of the mechanism for adjusting the cutter. Fig. 5 represents a transverse sectional view on line 5—5 of Fig. 3. Fig. 6 represents a front view of one of the cutters. Fig. 7 represents a view of the inner side thereof, and Fig. 8 represents a plan view of one of the removable cutter blades. Fig. 9 is a sectional view on line 9—9 of Fig. 7.

In the drawings the numeral 1 designates the frame of the traction engine to which my improved cutters are secured, said frame having the front wheels 2 and the broad rear driven wheels 3 mounted on the axle 4 and having the sprockets 5 engaged by the sprocket chains 6 which also pass over the sprockets 7 of the shaft 8 driven by the engine 9.

Journaled in the bearings 10 on the under side of the frame are the shafts 11 each having an outer squared end 12, while secured on the inner ends of the shafts 11 are the sprockets 13 in mesh with the upper portion of the chain 6 and driven thereby. Slidably mounted on the squared portion 12 of the shaft is the collar 13' having the large pinion 14 and the smaller pinion 15 on its opposite ends, a shifting lever 16 engaging the collar to move the same on the shaft.

The bearing 10 is formed with rounded ends 17, and rotatably mounted on said ends of the bearings are bell cranks 18, having secured to their lower ends 19 the stub shaft 20 bearing the spaced large gear 21 and smaller gear 22 between which the collar 13' and its pinions normally lie. The links 19' have their inner ends secured to the upper ends of the bell cranks 18 and have their outer ends secured to levers 21', the purpose of which will be obvious from the following description.

From the foregoing it will be seen that the shaft 11 is rotated forward by the chain 6, while by movement of the shifting lever 16 either the pinion 15 is moved into engagement with the gears 21 to drive the shaft 20 at a low rate of speed or the pinion 14 is moved into engagement with the gear 22 to drive the shaft 20 at a higher rate of speed.

Secured on the outer end of the shaft 20 is the wheel 23 which is of tough steel secured on its periphery at a plurality of points the base portion 24 of my improved cutters, said cutters having a share 25 inclined similar to a plow share but having a wing 26 extending rearward at an angle to the share. Formed integral with the base 24 and share 25 and extending forward at right angles to the shaft is the blade 27 acting as a colter to cut the soil and also serving to sever the roots lying above the share. Forming a point for the share and removably secured thereto by the bolts 28 is the triangular blade 29 which provides both a point and a forward or basal cutting edge for the share.

It will be apparent from the above description that the wheel with its cutters rotates in the direction in which the driving wheels move and that said wheel being powerfully driven and moving at a comparatively high rate of speed will chop or cut through the roots lying under the surface of the soil or on the top of the soil and will at the same time turn the earth and bring said roots on the surface. It will be understood that while I have illustrated but six cutters applied to the machine I may increase or decrease the number of the same on either or both sides of the machine as desired, while to clear the ground from the roots and also to aid in breaking up the clods loosened by the cutters I secure to the frame 1 the laterally projecting bar 30 bearing the harrow or rake teeth 31.

It will thus be observed that I have provided an efficient machine for removing palmetto roots which will do the work of eight or ten men removing the roots by hand as is now customary, and will thus prove a highly satisfactory and desirable root destroying and ground developing machine.

I claim:

A cutter consisting of a wheel having a plurality of cutters having base portions by which the same are supported upon the periphery of the wheel, said cutters being further provided with curved shares which over hang the base portions, blades having curved cutting edges and extending from the base portions to the points of the shares and at obtuse angles thereto, wings formed integral with the shares and projecting outwardly therefrom at points opposite the cutting edges, and triangular plates removably secured to the share points.

In testimony whereof I affix my signature, in the presence of two witnesses.

JAMES M. RUTLEDGE.

Witnesses:
G. S. CARN,
ETHEL BORLAND.

---

Copies of this patent may be obtained for five cents each, by addressing the "Commissioner of Patents, Washington, D. C."